United States Patent [19]

Simmons

[11] Patent Number: 4,481,690
[45] Date of Patent: Nov. 13, 1984

[54] COMBINATION SCRAPER AND KEYCASE

[76] Inventor: Steven J. Simmons, 31004 W. Amurcon, Fraser, Mich. 48026

[21] Appl. No.: 481,726

[22] Filed: Apr. 4, 1983

[51] Int. Cl.$^3$ .............................................. B60S 1/04
[52] U.S. Cl. ................................... 15/236 R; 15/105; 30/169; 30/172
[58] Field of Search ............... 15/105, 236 R; 30/125, 30/153, 162, 169, 172; D3/64

[56] References Cited

U.S. PATENT DOCUMENTS

| D. 183,262 | 7/1958 | Monson | D3/64 |
| 2,242,992 | 5/1941 | Devor | 15/105 X |
| 2,896,290 | 7/1959 | Salm et al. | D3/64 |
| 3,964,162 | 6/1976 | Gerson et al. | 30/162 |

Primary Examiner—Edward L. Roberts
Attorney, Agent, or Firm—Burton, Parker & Schramm

[57] ABSTRACT

A combination scraper and keycase having a hollow body providing a compartment for keys, coins or the like and a pair of blades swingably mounted on the body for movement between positions housed in the body and extended operable positions in which the blade cooperatively forms an elongated scraping edge.

7 Claims, 10 Drawing Figures

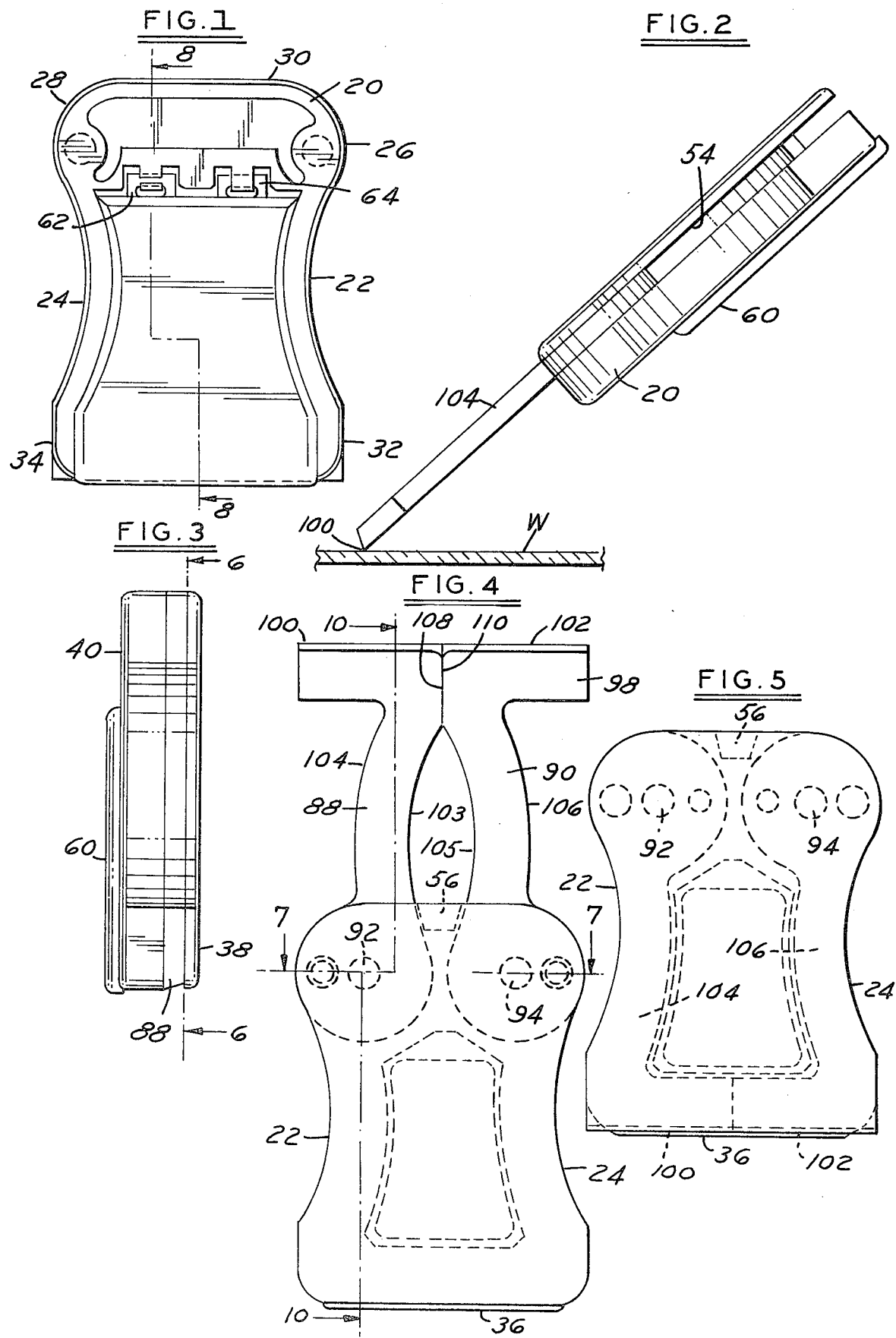

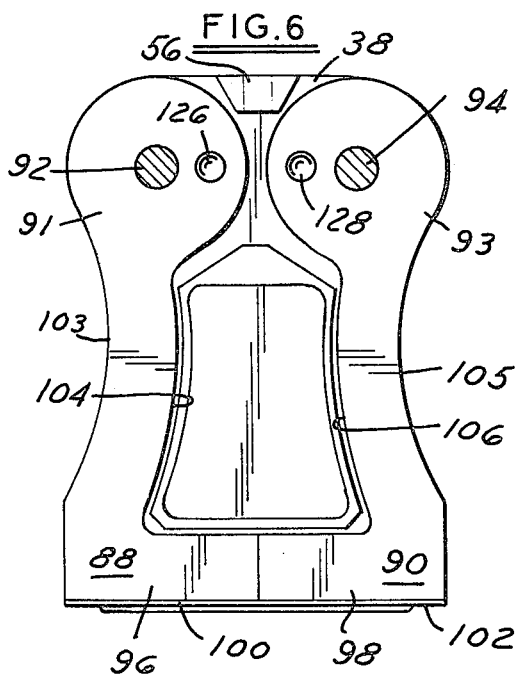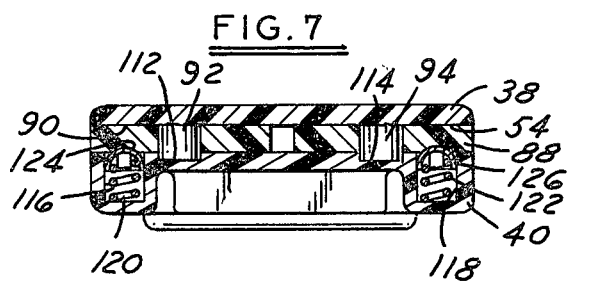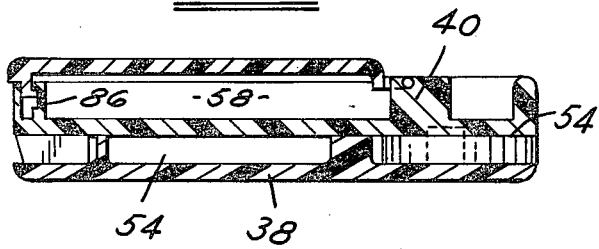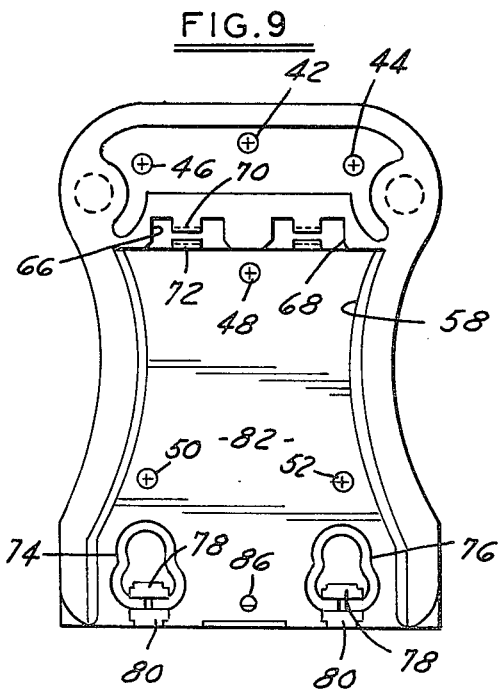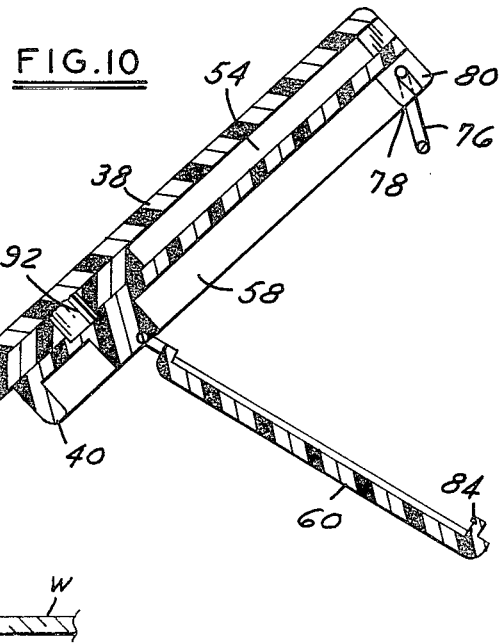

COMBINATION SCRAPER AND KEYCASE

DESCRIPTION

FIELD OF INVENTION

This invention relates to an automobile window scraper in combination with a keycase such as a case for holding automobile door or house keys.

BACKGROUND OF THE INVENTION

In northern climates where snow and ice may periodically cover automobile windows, it is necessary to use a scraper to remove the same from the windows. These scrapers are generally somewhat bulky and are thrown on the floor, back seat or occasionally stuffed under the front seat and are usually in the way and a nuisance.

Additionally, the average motorist carries several keys to gain entrance to his automobile, house or apartment, office and the like, and these are generally carried either in a keycase or on a keyring.

SUMMARY OF THE INVENTION

I have provided a combination window scraper and keycase of a size which may be easily carried in a clothes pocket, in a handbag, or placed in the automobile glove box or other automobile pocket. The device includes a compartment for receiving keys or coins and a lid for closing the compartment. The device also includes scraper blade means shiftable from a position housed in the device to an operable position projecting therefrom. The device is configured to be comfortably held in the hand during manipulation to gain access to the key compartment or during window scraping operations.

BRIEF DESCRIPTION OF THE DRAWINGS

FIG. 1 is a plan view of a combination scraper and keycase embodying my invention;

FIG. 2 is a side view of the device with the scraper blades extended into operable position and showing them in relation to a window or other surface to be scraped;

FIG. 3 is a side view of the device but with the scraper blades in their inoperative housed position;

FIG. 4 is a plan view from the opposite side of the device from that shown in FIG. 1 with the scraper blades extended to operable position;

FIG. 5 is similar to FIG. 4 but with the blades moved to their inoperative housed position;

FIG. 6 is a cross-sectional view taken on line 6—6 of FIG. 3.;

FIG. 7 is a cross-sectional view taken on line 7—7 of FIG. 4;

FIG. 8 is a cross-sectional view taken substantially on a line 8—8 of FIG. 1;

FIG. 9 is a plan view similar to FIG. 1 but with the key compartment cover removed for clarity; and FIG. 10 is a cross-sectional view taken substantially on the line 10—10 of FIG. 4.

DESCRIPTION OF PREFERRED EMBODIMENTS

As shown in the various figures of the drawing, my combination scraper and keycase comprises a body member or handle 20 having concave opposite edges 22 and 24 with rounded corners 26 and 28 merging into upper end 30. At the opposite end the concave edges 22 and 24 blend into straight sides 32 and 34 which terminate in a lower edge 36 shown in FIG. 4. The body member or handle is thus shaped to conveniently rest in the palm of a user's hand with the base of the thumb lying in one of the concave edges and the fingers curling around the opposite concave edge such that the body member is readily and comfortably held for the uses hereinafter outlined.

The body member may be formed of several elements secured together as hereinafter described. As shown in FIGS. 7-10, the body includes a lower member 38 to which is secured in overlying relation an upper member 40 as by self tapping screws 42, 44, 46, 48, 50 and 52. These two body members cooperatively define a peripheral outwardly opening blade receiving channel 54. This channel extends completely around the periphery of the body member except for the web 56.

The upper member 40 is provided with a recess 58, best shown in FIGS. 8, 9 and 10, which may be closed by a cover 60 hinged thereto. For this purpose the cover is provided with a pair of integral loops 62 and 64 which are disposed within hinge receiving pockets 66 and 68, best shown in FIG. 9, and between cooperating portions 70 and 72 in each such pocket. Portions 70 and 72 are intended to embrace the loops and retain the same in the pockets.

Means for retaining keys in the compartment or recess 58 is provided. Such means may comprise a pair of split loops 74 and 76 each disposed between a pair of upstanding projections 78 and 80 on the bottom wall 82 of the recess or compartment 58. The split loop may be formed of metal having sufficient springiness so that a key may be inserted onto the loop through the split. The cover 60 is provided with an integral catch 84 adapted to cooperate with a complementary catch part 86 upstanding from the bottom wall 82. Such catch parts will releasably hold the cover closed to retain keys or coins or the like which may be placed in the compartment.

Blade means are mounted on the body member for shiftable movement between an inoperable position housed therein and an operable position projecting outwardly therefrom as best shown in FIGS. 2, 4 and 10. Such blade means comprise a pair of allochiral scraper blades 88 and 90 pivotally connected at their proximal disc-like ends 91 and 93 to the body member and having at their distal ends transversely extending blade portions 96 and 98 provided with scraping edges 100 and 102. In the operable position shown in FIG. 4 the blades have oppositely facing convex edges 104 and 106, and opposed concave edges 103 and 105. In their operable position the blades abut one another at meeting edges 108 and 110, with the blade portions 96 and 98 disposed in end-to-end relation whereby the scraping edges 100 and 102 effectively form a continuous edge across the interface 108-110 to provide a scraper blade of a width substantially equal to that of the width of the body member 20. The web 56 serves to limit the swinging motion of the blades. The abutment of the blades at the edges 108 and 110 also serves to provide a mutual support of the blades one for the other during scraping operations.

The lower member 38 is provided with a pair of integral bosses 92 and 94 which provide the pivots for the blades. These bosses extend through pivot holes in the enlarged dis-like ends 91 and 93 of the blades and into complementary recesses 112 and 114 in the upper member 40. To retain the blades in the extended operable position, detent means are provided comprising a pair of pockets 116 and 118 formed in the body portion 40 with compression springs 120, 122 received in such pockets. Cap members 124 and 126 are disposed over the ends of the springs and bear against the blade ends 91 and 93. A pair of shallow recesses or indentations 126 and 128 in the blades are located to receive the spring loaded caps 124 and 126 when the blades are in the position shown in FIG. 4 and releasably hold the blades in such operative position for scraping the automobile windows. In FIG. 7 the caps 124 and 126 are shown disposed within such indentations in the blades.

In FIGS. 2 and 10 a windshield or the like surface W is illustrated with the scraper in operative position in relation thereto. The shape of the body or handle 20 is such that the motorist's hand and fingers can readily encircle the concave sides 22 and 24 and the fingers can extend over the convex edges 104 and 106 thereby further holding the blades in the operative position shown in FIGS. 2 and 4.

The entire device except for the split rings 74 and 76, the screws 42–52 and the springs and caps 120–126 may be and preferably is formed of plastic, such as high impact styrene or ABS and the parts may be conveniently injection molded.

I claim:

1. A window scraper comprising, in combination:
   a body member adapted to be held in the hand;
   a pair of blade members each pivotally mounted on the body member for swingable movement between a position housed in the body member and a position extending outwardly therefrom;
   said scraper blade members extending transversely of the projected dimension of the window scraper when said blades are extended operably outwardly from the body member in edge abutting relation and having scraper blade portions disposed in end-to-end relation forming a window scraper blade.

2. The invention defined by claim 1 wherein each of said blade members has a scraper blade portion and the blade members are swingable from the housed position into abutting outwardly extending operable position wherein the scraper blade portions cooperatively form a scraper blade.

3. The invention defined by claim 1 wherein the body member has opposite concave hand-receiving side edges to facilitate grasping in the hand, and said scraper means when extending operably outwardly from the body member has convex finger-engaging side edges.

4. The invention defined by claim 1 wherein said body member has a recess therein, and a cover removably closing the recess to form a storage compartment in the body member.

5. The invention defined by claim 4 wherein there is means in said recess for removably retaining a key.

6. The invention defined by claim 1 wherein the body member has peripheral outwardly opening channel means for housing the scraper blades when in the inoperable position.

7. The invention defined by claim 6 wherein said scraper blades are each pivoted at one end to the body member for swingable movement between positions housed in said channel means and operable positions projecting outwardly from the body member and arranged in side by side edge abutting relation, said scraper blades each having a scraper portion extending transversely of its longitudinal dimension with the scraper portions of the blades arranged in end-to-end relation cooperatively forming a longer scraper when the scraper blades are in said operable edge abutting position.

* * * * *